(12) United States Patent
Davis et al.

(10) Patent No.: US 8,089,046 B2
(45) Date of Patent: Jan. 3, 2012

(54) METHOD AND APPARATUS FOR CALIBRATING MASS FLOW CONTROLLERS

(75) Inventors: Matthew F. Davis, Felton, CA (US);
Thorsten B. Lill, Santa Clara, CA (US);
Quentin E. Walker, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 628 days.

(21) Appl. No.: 12/233,805

(22) Filed: Sep. 19, 2008

(65) Prior Publication Data
US 2010/0071438 A1  Mar. 25, 2010

(51) Int. Cl.
*G01F 25/00* (2006.01)
*G01F 1/58* (2006.01)
*G01F 1/86* (2006.01)

(52) U.S. Cl. .................. 250/356.1; 250/252.1; 250/349

(58) Field of Classification Search ............... 250/356.1, 250/252.1, 349, 341.5, 343–344; 73/1.34; 702/49, 100, FOR. 128
See application file for complete search history.

(56) References Cited

U.S. PATENT DOCUMENTS

| 3,520,657 | A | * | 7/1970 | Frumerman | ............. 436/56 |
| 4,393,304 | A | * | 7/1983 | Ishida et al. | ............. 250/343 |
| 4,836,999 | A | * | 6/1989 | Reed et al. | ............. 423/574.1 |
| 5,047,612 | A | * | 9/1991 | Savkar et al. | ............. 219/121.47 |
| 5,744,695 | A | | 4/1998 | Forbes | |
| 6,716,477 | B1 | * | 4/2004 | Komiyama et al. | ............. 427/8 |
| 7,091,043 | B2 | * | 8/2006 | Itou et al. | ............. 436/113 |

FOREIGN PATENT DOCUMENTS

| CN | 101074903 A | * | 11/2007 |
| EP | 0370311 A2 | | 5/1990 |
| JP | 09318532 A | * | 12/1997 |
| JP | 2005291741 A | * | 10/2005 |

* cited by examiner

*Primary Examiner* — Thomas P Noland
(74) *Attorney, Agent, or Firm* — Alan Taboada; Moser Taboada

(57) ABSTRACT

A method for determining the flow rate of a gas includes measuring a first concentration of a calibration gas provided to the process chamber at a first pressure and temperature by directing infrared radiation into the process chamber and monitoring a first amount of infrared radiation absorbed by the calibration gas. A mixture of a second gas and the calibration gas is provided to the process chamber while maintaining the first pressure and temperature. A second concentration of the calibration gas in the mixture is measured by directing infrared radiation into the process chamber and monitoring a second amount of infrared radiation absorbed by the calibration gas. A flow rate of the second gas is calculated by comparing the first and second concentrations of the calibration gas. In one embodiment, the calibration gas and the second gas may not absorb the infrared radiation at the same wavelength.

15 Claims, 4 Drawing Sheets

METHOD AND APPARATUS FOR CALIBRATING MASS FLOW CONTROLLERS

BACKGROUND

1. Field

Embodiments of the present invention generally relate to semiconductor processing equipment and more particularly, to methods and apparatus for calibration of mass flow controllers.

2. Description of the Related Art

Continued reduction in size of semiconductor devices is dependent upon more precise control of, for instance, the flow rate of process gases delivered to a semiconductor process chamber in which such semiconductor devices are processed. Typically, the process gases are provided utilizing a mass flow controller for each process gas being delivered to the chamber.

To maintain precise control, the mass flow controllers must provide an accurate and repeatable operation. Therefore, the mass flow controllers are periodically calibrated, for example, every few weeks. Typically, a calibration process may involve individually comparing the flow rate from each mass flow controller to that of a standard mass flow controller (e.g., a mass flow controller known to be calibrated accurately) at a known pressure and temperature. Unfortunately, the calibration process can only be performed to an uncertainty of about 5% for each mass flow controller, which may be too imprecise for future processing. In addition, the calibration of the mass flow controllers drift over time, leading to process variation. Furthermore, the standard mass flow controller also drifts over time, which can further result in inaccurate calibrations.

Accordingly, there is a need in the art for methods and apparatus to calibrate mass flow controller to greater certainty.

SUMMARY

Embodiments of the present invention comprise a method for determining the flow rate of a gas provided to a process chamber. In some embodiments, a method for determining the flow rate of a gas includes measuring a first concentration of a calibration gas provided to the process chamber at a first pressure and temperature by directing infrared radiation into the process chamber and monitoring a first amount of infrared radiation absorbed by the calibration gas. A mixture of a second gas and the calibration gas is provided to the process chamber while maintaining the first pressure and temperature. A second concentration of the calibration gas in the mixture is measured by directing infrared radiation into the process chamber and monitoring a second amount of infrared radiation absorbed by the calibration gas. A flow rate of the second gas is calculated by comparing the first and second concentrations of the calibration gas. In some embodiments, the calibration gas and the second gas may not absorb the infrared radiation at the same wavelength.

In some embodiments, a method for calibrating a plurality of mass flow controllers provided to a plurality of process chambers includes providing a single infrared radiation source to a plurality of process chambers, each process chamber having one or more mass flow controllers. At least one of the one or more mass flow controllers of each process chamber may be calibrated by measuring a first concentration of a calibration gas provided to the process chamber at a constant pressure and temperature by directing infrared radiation into each process chamber and monitoring a first amount of infrared radiation absorbed by the calibration gas. A mixture of a desired gas and the calibration gas may be provided to each process chamber while maintaining the constant pressure and temperature. A second concentration of the calibration gas in the mixture may be measured by directing infrared radiation into the process chamber and monitoring a second amount of infrared radiation absorbed by the calibration gas. A flow rate of the desired gas may be calculated by comparing the first and second concentrations of the calibration gas. The calculated flow rate may be compared to a readback value of a mass flow controller providing the desired gas. A calibration factor of the mass flow controller may be adjusted in response to the comparison. In some embodiments, the inventive methods may be performed in each process chamber for each mass flow controller to be calibrated. In some embodiments, the inventive methods may be performed in a serial process (e.g., each mass flow controllers on each process chamber may be calibrated sequentially), or in a parallel process (e.g., mass flow controllers on each process chamber may be calibrated simultaneously).

In some embodiments, an apparatus for use in calibrating one or more mass flow controllers includes a first process chamber having a gas source for providing a calibration gas to the first process chamber and a mass flow controller for providing a second gas to the first process chamber. An infrared radiation source is coupled to the first process chamber a detector coupled to the first process chamber and configured to detect infrared radiation transmitted by the calibration gas. A controller is configured to calculate a calibration factor for the mass flow controller based upon a detected infrared radiation transmitted by the calibration gas.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The drawings have been simplified for clarity and are not drawn to scale. To facilitate understanding, identical reference numerals have been used, wherever possible, to designate identical elements that are common to the figures.

DETAILED DESCRIPTION

Embodiments of methods and apparatus for calibrating mass flow controllers are provided herein. In some embodiments, the inventive methods may include using infrared (IR) radiation to calibrate one or more mass flow controllers coupled to a semiconductor process chamber. In some embodiments, the inventive methods may be further applied to one or more process chambers using either a serial or parallel process to calibrate the mass flow controllers coupled to each process chamber. The inventive methods and apparatus may advantageously provide improved calibration of mass flow controllers. In some embodiments, the inventive methods and apparatus may advantageously provide calibration of mass flow controllers to an accuracy of within about 1%.

Figure 1:
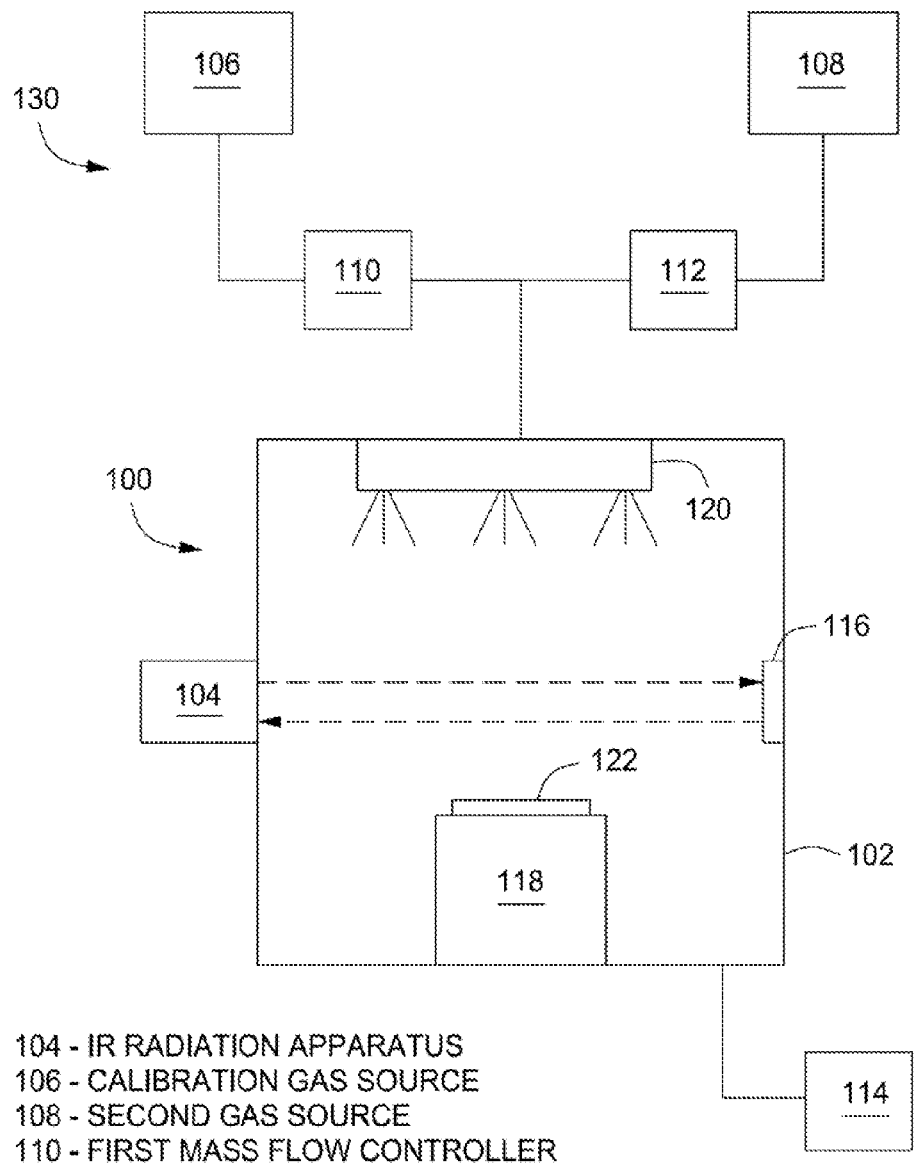
FIG. 1 depicts a semiconductor processing chamber having an apparatus for calibrating a mass flow controller in accordance with some embodiments of the present invention.

FIG. 1 depicts a schematic view of an apparatus 100 for calibrating mass flow controller in accordance with some embodiments of the present invention. The apparatus 100 may include a process chamber 102, an IR radiation apparatus 104, a gas delivery system 130, and a controller 114. The gas delivery system 130 supplies process gases at desired flow rates to the process chamber 102. Using the apparatus and techniques disclosed herein, the IR radiation apparatus 104 may be utilized to calibrate one or more mass flow controllers that are a part of the gas delivery system 130.

The process chamber 102 may be any suitable process chamber having at least two gases (e.g., a calibration gas and a second gas), wherein each gas is delivered to the process chamber via a mass flow controller. Examples of suitable process chambers include the DPS® line of semiconductor equipment (such as the DPS®, DPS® II, DPS® AE, DPS® G3 poly etcher, or the like), the ADVANTEDGE™ line of semiconductor equipment (such as the AdvantEdge, AdvantEdge G3), or other semiconductor equipment (such as ENABLER®, E-MAX®, or like equipment), also available from Applied Materials, Inc. The above listing of semiconductor equipment is illustrative only, and other processing equipment using mass flow controllers to deliver process gases to a process chamber may also be suitably modified in accordance with the teachings provided herein.

In some embodiments, the process chamber 102 may illustratively include a shower head 120 for delivering gases to the process chamber 102. The showerhead 120 provides, through a plurality of openings, distribution of gases or vapors delivered from various gas sources (e.g., the calibration gas and the second gas). The size, geometry, number, and location of the openings can be selectively chosen to facilitate a predefined pattern of gas and/or vapor flow. The showerhead 120 depicted in FIG. 1 is exemplary and gases may, alternatively or in combination, enter the process chamber through a number of means including via nozzles, and/or fixtures in the chamber wall, proximate the substrate, or by any other suitable means for delivering the process gases as desired into the process chamber.

The process chamber 102 further may illustratively include a substrate support 118 which may be utilized to hold a substrate 122 during processing in the process chamber. The substrate support 118 may include a means of holding the substrate 122 such as an electrostatic chuck or physical positioning system such as guide pins proximate the desired position of the wafer edge on the support surface. Further, the support 118 may include any suitable means for processing a substrate such as an electrode for supplying DC or RF bias, or a system for the supply and/or removal of heat from the substrate 122 or surface of the substrate support 118.

The gas delivery system 130 may include a plurality of gas sources (such as for providing a plurality of process gases to the process chamber 102) coupled to a plurality of mass flow controllers (for controlling the rate at which the respective process gases are supplied). For example, as illustratively depicted in FIG. 1, the gas delivery system 130 may comprise a calibration gas source 106 coupled to the process chamber 102 via a first mass flow controller 110 and a second gas source 108 coupled to the process chamber 102 via a second mass flow controller 112. Additional gas sources and mass flow controllers may be provided for delivering additional gases to the process chamber 102 as desired.

The first mass flow controller 110 is used to control the flow of the calibration gas from the calibration gas source 106 into the process chamber 102. The first mass flow controller 110 may provide a readback value that represents the quantity or mass of the calibration gas 106 flowing therethrough. The accuracy of the readback value is dependent on the calibration of the mass flow controller (e.g., if the mass flow controller is not calibrated properly, the readback value is not accurate). In some embodiments, the mass flow controller 110 may be calibrated such that it provides a readback value that accurately reflects the flow rate of the calibration gas being delivered to the process chamber.

Similarly, the second mass flow controller 112 may be used to control the flow of the second gas from the second gas source 108 into the process chamber 102. Using the inventive techniques disclosed herein, and described in more detail below, the second mass flow controller 112 may be calibrated such that a readback value of the second mass flow controller 112 accurately reflects the flow rate of the second gas being delivered to the process chamber 102 from the second gas source 108.

The IR radiation apparatus 104 generally includes an IR source and a detector. The IR source and detector may be integral (as shown in FIG. 1) or they may be separate components. The IR source may be any suitable source of IR radiation configured to direct IR radiation at a desired wavelength into the process chamber 102. In some embodiments, the IR radiation source can be a laser source such as a quantum cascade (QC) laser. Exemplary QC lasers include those available from Sacher Lasertechnik GMBH of Marburg, Germany. Alternatively, the QC laser may be part of an integrated system, for example a quantum cascade laser measurement and control system (QMACS) system available from Neoplas Control GMBH of Greifswald, Germany. In some embodiments, the QC laser may provide a power output of between about 20 to about 100 mW. Using a quantum cascade laser as the IR source advantageously facilitates improving detection limits at low concentrations of the calibration gas.

The IR detector of the IR radiation apparatus 104 may be any suitable detector that may discriminate laser pulses and permit synchronous detection, for example, a photodiode detector. One exemplary photodiode detector is available with the QMACS system available from Neoplas Control GMBH of Greifswald, Germany. The IR detector is generally positioned to receive the beam of IR radiation after it passes through the gases present in the process chamber 102. For example, in the embodiment depicted in FIG. 1, a mirror 116 may be provided to reflect the IR radiation back towards the IR radiation apparatus 104, and the IR detector contained therein. The mirror 116 can be any mirror which may be able to reflect IR radiation with high efficiency (e.g., 99% or greater). Alternatively, the detector may be positioned opposite the IR source, for example, in place of the mirror 116. In some embodiments, a plurality of mirrors (not shown) may be provided to increase the path length of the IR radiation traveling through the calibration gas, thereby increasing the detection limits of the calibration gas. For example, in some embodiments, a plurality of mirrors (not shown) may be provided to increase the path length, thereby allowing the IR radiation from the source to traverse the width of the chamber multiple times prior to reaching the detector. In some embodiments, the IR detector of the IR radiation apparatus 104 may be configured to detect a concentration of the calibration gas of at least about 0.01 molecules/cm$^3$.

In some embodiments, the IR source and/or the detector of the IR radiation apparatus 104 may be external to the process chamber 102 and may direct and/or receive IR radiation to/from the process chamber 102 via a window which is transparent to the wavelength of IR radiation being supplied. Alternatively, the IR source and/or detector may be coupled directly to the process chamber 102 via a vacuum flange or similar connection which allows the chamber to maintain operating pressures in the process chamber 102. The IR source and/or detector may also be positioned in other geometries with optics supplied for directing the IR radiation into and/or out of the process chamber 102 as desired.

In operation, the IR radiation source of the IR radiation apparatus 104 provides a beam of IR radiation into the chamber and the detector detects the IR radiation transmitted through, for example, the calibration gas provided by the calibration gas source 106. A portion of the IR radiation directed into the process chamber 102 is absorbed by the calibration gas contained therein and the remaining portion is detected by the detector. The remaining portion is dependent upon the intensity of the IR radiation of the source, the intrinsic absorption coefficient of the calibration gas, and the path length traversed by the radiation between the source and the detector. The remaining portion of IR radiation may be used to determine the absolute molar concentration of the calibration gas in the process chamber, as discussed in more detail below. Of course, depending upon the configuration of the IR source and the detector, the path length of the IR radiation may vary, for example, to increase the path length of the IR radiation traversed between the IR source and the detector, thereby improving the detection limits of the calibration gas present in the process chamber 102.

For example, in the embodiment shown in FIG. 1, IR radiation from the IR radiation source is directed into the process chamber 102 in the direction of the mirror 116. As the IR radiation proceeds towards the mirror 116, a first portion of the radiation is absorbed by the calibration gas 106. A remaining portion (e.g., the portion not absorbed by the calibration gas) of the IR radiation is reflected from the mirror 116 back towards the detector located in the IR radiation apparatus 104. A second portion of IR radiation is absorbed by the calibration gas and the remaining portion of IR radiation reaches the detector to be detected. Using additional mirrors and/or other configurations, IR radiation may be suitably directed into the process chamber and detected by the detector to determine the quantity of IR radiation absorbed and/or transmitted by the gases present in the process chamber 102.

The controller 114 generally comprises a central processing unit (CPU), a memory, and support circuits and may be coupled to one or more of the components of the apparatus 100 and capable of controlling any of the components individually or in unison for performing a process within the chamber 102. In operation, the controller 114 controls components and operations of the apparatus 100, or provides instructions to controllers associated with these components. In some embodiments, the controller 114 is configured to calculate a calibration factor for one or more mass flow controllers (such as the mass flow controller 112) based on the detected IR radiation transmitted by the calibration gas, as discussed below in more detail with respect to FIGS. 3-4.

Figure 2:
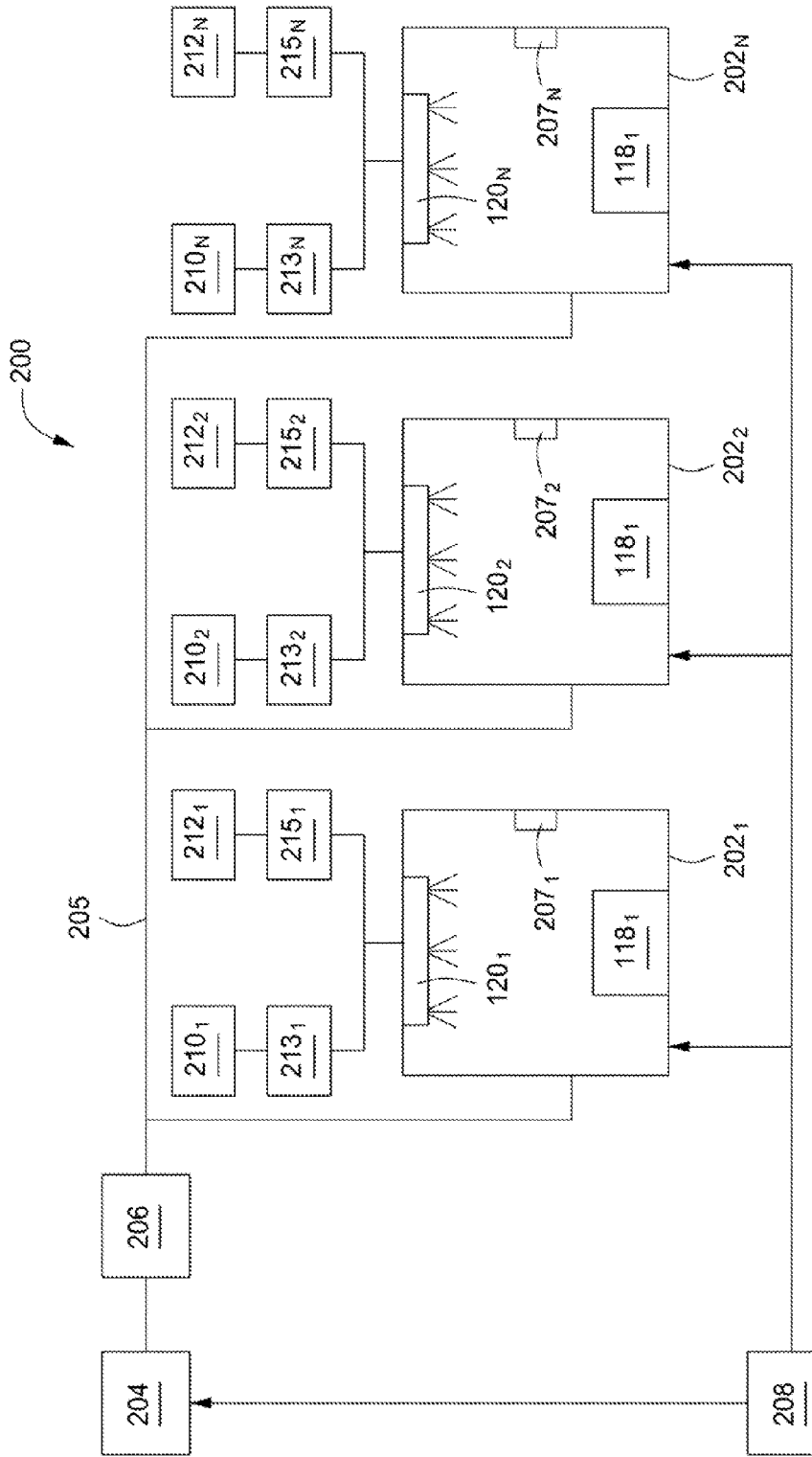
FIG. 2 depicts a plurality of semiconductor processing chambers having an apparatus for calibrating a mass flow controller in accordance with some embodiments of the present invention.

The inventive methods and apparatus by which mass flow controllers may be calibrated may be applied to a plurality of process chambers using a singular IR radiation source coupled to the plurality of process chambers. For example, FIG. 2 illustrates one such an apparatus 200 including an IR apparatus 204 coupled to a plurality of process chambers 202 (illustrated as a first process chamber 202$_1$, a second process chamber 202$_2$, . . . , and an n$^{th}$ process chamber 202$_n$). The components of each process chamber 202 are similar to those of the process chamber 102 discussed above with respect to FIG. 1.

Each process chamber 202 is coupled to a gas delivery system including a plurality of gas sources (such as for providing a plurality of process gases to the respective process chamber 202) coupled to a plurality of mass flow controllers (for controlling the rate at which the respective process gases are supplied). For example, as illustratively depicted in FIG. 2, the gas delivery system may comprise a calibration gas source 210 (depicted as 210$_1$, 210$_2$, . . . 210$_n$) coupled to the respective process chamber 202 via a first mass flow controller 213 (depicted as 213$_1$, 213$_2$, . . . 213$_n$) and a second gas source 212 (depicted as 212$_1$, 212$_2$, . . . 212$_n$) coupled to the respective process chamber 202 via a second mass flow controller 215 (depicted as 215$_1$, 215$_2$, . . . 215$_n$). Additional gas sources and mass flow controllers may be provided for delivering additional gases to the process chambers 202 as desired.

As in illustrated in FIG. 2, in some embodiments, the IR radiation apparatus 204 may be coupled to each process chamber via an optical fiber 205 (or optical fiber bundle). The optical fiber 205 may be any suitable optical fiber for transmitting IR radiation. The optical 205 fiber may direct IR radiation into the process chamber via a transparent window or alternatively via a vacuum compatible feedthrough mechanism. In operation, similar to the embodiments of FIG. 1, IR radiation is directed from the IR source via the optical fiber 205 into each process chamber 202. The IR radiation not absorbed by the calibration gas 210 may reflected by a mirror 207 (depicted as 207$_1$, 207$_2$, . . . 207$_n$) back towards the optical fiber 205. The IR radiation not absorbed by the calibration gas 210 from the mirror 207 to the optical fiber is transmitted through the optical fiber to the IR radiation apparatus 204, where it is detected by the detector. Similar to the embodiments described above in FIG. 1, the IR radiation apparatus 204 may comprise an IR radiation source with separate detectors (not shown) coupled to each process chamber. In some embodiments, separate detectors may be provided in place of the mirror 207. Similar to FIG. 1, the IR radiation apparatus 204 may further comprise a plurality of mirrors (not shown) coupled to each process chamber 202 to increase the path length between the source and the detector, and hence improve the detection limits for the minimum detectable concentration of the calibration gas.

In some embodiments, the IR radiation emanating from the IR radiation apparatus 204 may be routed to each process chamber 202 via an optical apparatus 206 disposed between the IR radiation apparatus 204 and each process chamber 202. The optical apparatus 206 may include at least one of an optical assembly, a multiplexer, a demultiplexer, or a beam splitter. In some embodiments, the optical apparatus 206 may be used in either a serial or parallel process for determining the concentration of the calibration gas in one or more of the process chambers 202.

For example, in some embodiments, such as when a serial process is performed, the optical apparatus 206 may comprise an optical assembly for routing the IR radiation via the optical fiber 205 sequentially to each process chamber. For instance, in operation, the IR radiation may be routed to the first process chamber 202$_1$, the concentration of calibration gas detected, and then the IR radiation from the apparatus 204 may next be routed to the second chamber 202$_2$, or any other chamber 202. Thus, the concentration of calibration gas from each chamber 202 is measured serially, e.g., in a serial process. It is contemplated that the optical assembly may be any optical assembly suitable for routing IR radiation, and may further comprise one or more of mirrors, prisms, optical switching mechanisms, or the like.

In some embodiments, such as when a parallel process is performed, the optical apparatus 206 may comprise a multiplexer, a de-multiplexer, and a beam splitter. In such embodiments, the IR radiation may comprise a complex signal comprising a combination of component signals having the same IR radiation wavelength and different pulsed frequencies. Alternatively, each component signal may comprise a different wavelength and a different pulsed frequency, or a different wavelength and the same pulsed frequency. The complex signal may be formed in the IR radiation apparatus 204 or at some point between the IR radiation apparatus 204 and the optical apparatus 206 by an appropriate optical device such as a multiplexer. The complex signal may be multiplexed by any suitable algorithm, such as time division, frequency division, or the like.

In some embodiments where the complex signal comprises a plurality of signals having different pulsed frequencies, the complex signal can be de-multiplexed at the optical apparatus 206 into outgoing component signals having different pulsed frequencies. The outgoing component signals may then be routed to each process chamber 202 simultaneously via a beam splitter which may be part of the optical apparatus 206. Alternatively, the complex signal may be provided to each chamber and filtered appropriately to provide only the desired component signal of to a particular chamber. In any case, the component signals may be returned to the optical apparatus from each chamber 202. In embodiments where a detector is located in each process chamber 202, the component signals are not returned.

When the component signals are returned from each process chamber 202 after IR radiation is absorbed by the calibration gas, the optical apparatus 206 may include a multiplexer for multiplexing the component signals into an incoming complex signal by the multiplexer and transported to the IR radiation apparatus 204 to be detected by the detector. The incoming complex signal may be de-multiplexed into components signals prior to detection by the detector so that the specific component signals may be correlated to the appropriate process chamber 202.

In some embodiments wherein a detector is located within each process chamber 202, the outgoing signal may comprise a plurality of component signals, having the same pulsed frequency. The optical apparatus 206 may include a beam splitter for splitting the outgoing signal into component signals. The component signals can be routed to each chamber 202 simultaneously, interact with the calibration gas, and be detected by a detector in each chamber 202.

The controller 208 generally comprises a central processing unit (CPU), a memory, and support circuits and may be coupled to one or more of the components of the apparatus 200, and capable of controlling any of the components individually or in unison for performing a process within one or more process chambers 202. The controller 208 may also be coupled to individual controllers coupled to each chamber 202 (similar to the controller 114 of FIG. 1). In operation, the controller 208 controls components and operations of the apparatus 200, or provides instructions to controllers associated with these components. In some embodiments, the controller 208 is configured to calculate a calibration factor for each mass flow controller 215 based on the detected IR radiation transmitted by the calibration gas by inventive methods discussed below with respect to FIGS. 3-4.

Figure 3:
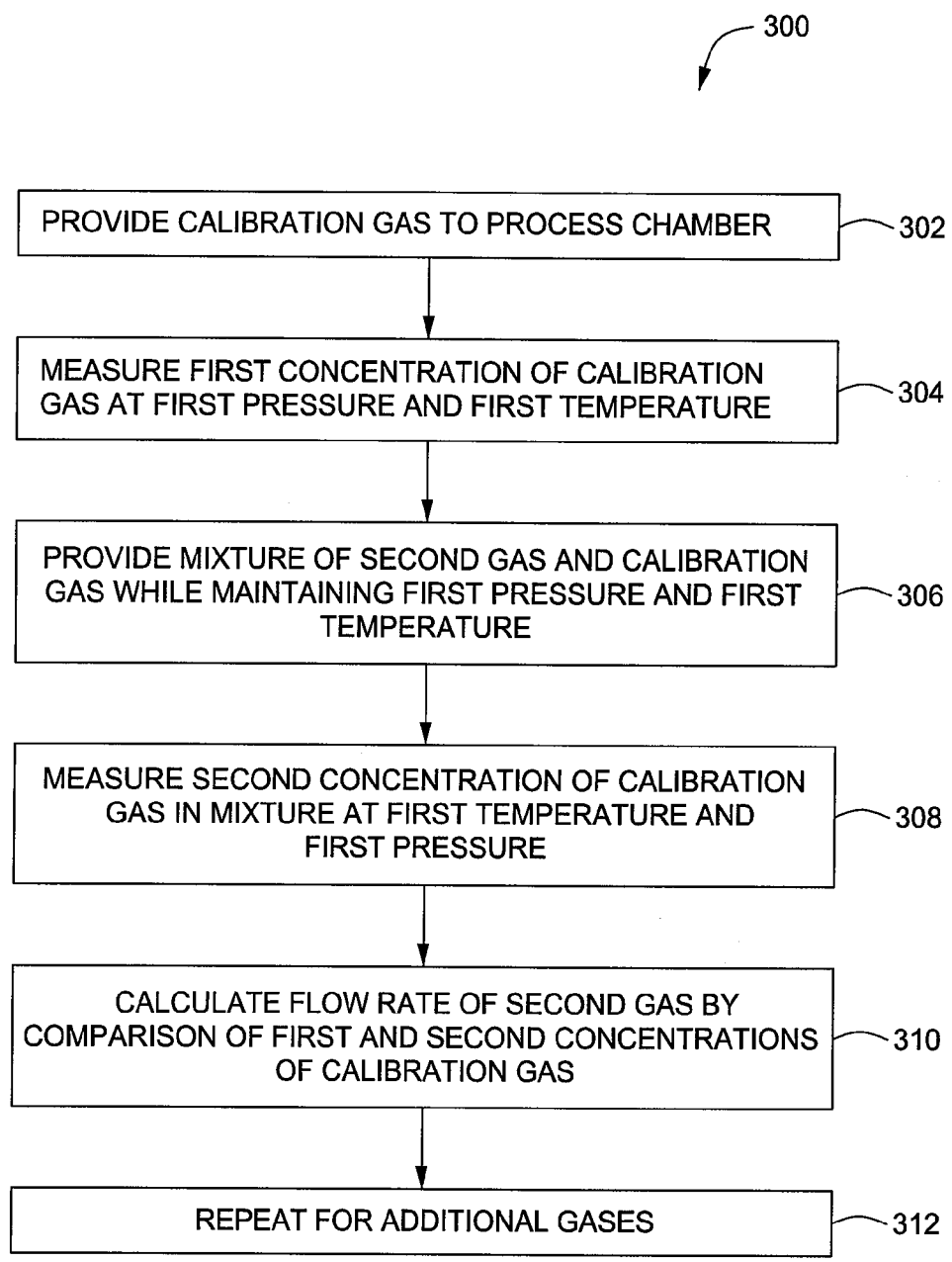
FIG. 3 depicts a method for determining the flow rate of a gas provided to a process chamber in accordance with some embodiments of the present invention.

Inventive methods for calibrating a mass flow controller using the apparatus described above are illustrated in FIGS. 3-4. FIG. 3 illustrates a method 300 for calibration of mass flow controllers in accordance with embodiments of the present invention. The method 300 is described below with respect to the apparatus 100 depicted in FIG. 1, however, is further applicable to the apparatus 200 and variants thereof.

The method 300 begins at 302, where a calibration gas may be provided to the process chamber 102. The calibration gas may be provided from the calibration gas source 106 by the mass flow controller 110 to the process chamber 102. The calibration gas may be any gas that strongly absorbs IR radiation. The calibration gas may also be selected to have a different absorption wavelength than that of the other gases being provided by mass flow controllers to be calibrated. The calibration gas may have an IR absorption cross section or molar extinction coefficient that is not a strong function of temperature. In some embodiments, the absorption cross section of the calibration gas can be sufficient to provide no more that 1% uncertainty when diluted by 90% by a second gas.

The calibration gas may advantageously be a gas that is already coupled to the process chamber for performing particular processes, such as etching, deposition, or the like. Alternatively, a suitable calibration gas may be provided to the process chamber for the purpose of calibrating the mass flow controllers providing the process gases used in that particular process chamber. In some non-limiting examples, the calibration gas may be nitrogen trifluoride ($NF_3$), silicon tetrafluoride ($SiF_4$), carbon tetrafluoride ($CF_4$), or the like.

In some embodiments, it is presumed that the calibration of the mass flow controller 110 is accurate, or has previously been validated. In some embodiments, a calibration test for the mass flow controller 110 which supplies the calibration gas may be performed. For example, such a test may include monitoring the IR radiation absorbed by the calibration gas, calculating the absolute molar concentration of the calibration gas, and comparing the calculated concentration of the calibration gas with the readback value from the mass flow controller 110 and the pressure in the chamber 102 as obtained by a pressure sensor which monitors the pressure in the process chamber 102. The calibration check can advantageously serve as an independent check of the calibration of both the mass flow controller 110 and the pressure sensor. At a known volume and temperature of the chamber 102, the pressure in the chamber 102 and the flow rate of the calibration gas 106 as controlled by the mass flow controller 110 should produce a concentration of the calibration gas in the chamber 102 that is consistent with that calculated from the IR absorption. If the concentration based on the readback value and pressure is not consistent with that calculated from the IR absorption, then either the mass flow controller 110, the pressure sensor, or both is improperly calibrated. If this occurs, the method 300 may be terminated to determine the source of the inaccuracy (such as by recalibrating, repairing, or replacing either or both of the mass flow controller 110 or the pressure sensor).

A calibration test may be also performed by simultaneously measuring the IR absorption provided by two calibration gases, each provided by a separate mass flow controller, provided the calibration gases absorb IR radiation at different wavelengths. The calibration test may also be performed by providing one calibration gas and measuring the IR absorption at a plurality of flow rates. The non-linear transition between the flow rate provided and the pressure at each flow rate may provide an indication as to which component (e.g., the mass flow controller 110 or the pressure sensor) is not calibrated.

Figure 4A:
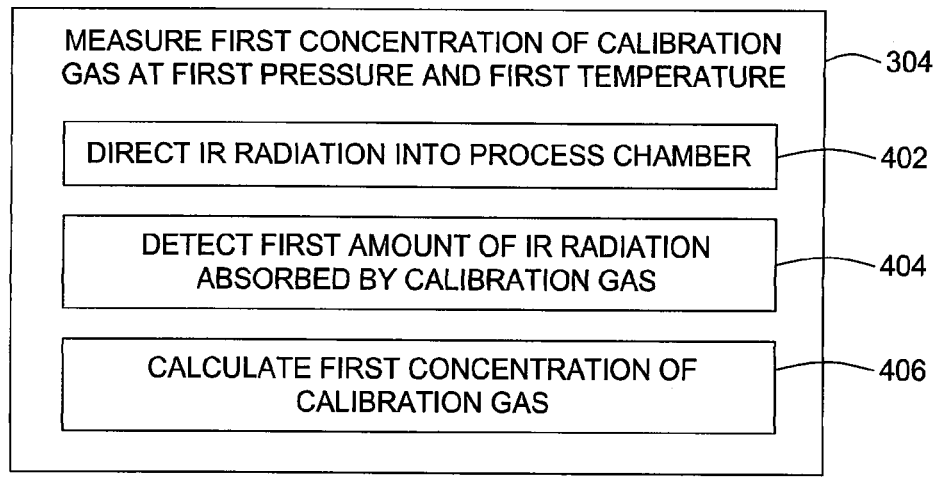
FIGS. 4A-B depict a method for measuring the concentration of a calibration gas in accordance with some embodiments of the present invention.

Next, at 304, a first concentration of the calibration gas is measured at a first temperature and a first pressure. One exemplary method of measuring the first concentration of the calibration gas at the first pressure and the first temperature at 304 is shown in FIG. 4A. As shown in FIG. 4A, at 402, IR radiation may be directed into the process chamber 102, for example, as described above with respect to FIGS. 1 and 2. Next, at 404, a first amount of IR radiation absorbed by the calibration gas may be detected, for example, as described above with respect to FIGS. 1 and 2. Next, at 406, the first concentration of the calibration gas may be calculated, for example, by the controller 114, based upon the detected IR radiation, the known process volume, temperature and pressure, and the characteristics of the particular calibration gas. In some embodiments, the concentration of the calibration gas includes an absolute molar abundance of the calibration gas within the process chamber 102.

Returning to FIG. 3, next, at 306, a mixture of a second gas (for example provided by the second gas source 108 via the second mass flow controller 112) and the calibration gas may be provided to the process chamber 102 while maintaining the first temperature and the first pressure. The first pressure can be maintained by reducing the flow rate of the calibration gas, increasing the flow through in the process chamber, or combinations thereof. As noted above, in some embodiments, the absorption wavelength of the calibration gas may be different from that of the second gas 108 in order to more accurately monitor the second concentration of the calibration gas. In some embodiments, the second gas may not absorb the IR radiation.

Figure 4B:
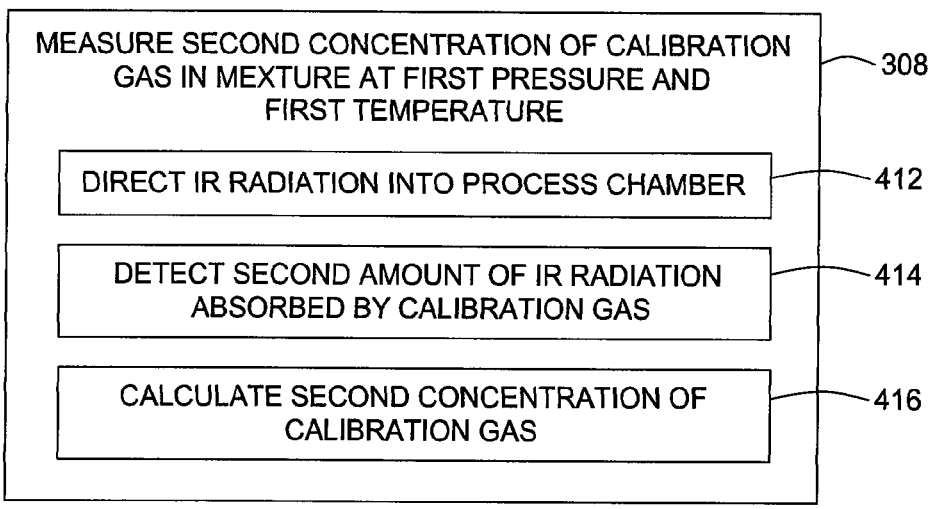

Next, at 308, a second concentration of the calibration gas is measured at the first temperature and the first pressure. One exemplary method of measuring the second concentration of the calibration gas at the first pressure and the first temperature at 308 is shown in FIG. 4B. As shown in FIG. 4B, at 412, IR radiation may be directed into the process chamber 102, for example, as described above with respect to FIGS. 1 and 2. Next, at 414, a second amount of IR radiation absorbed by the calibration gas may be detected, for example, as described above with respect to FIGS. 1 and 2. Next, at 416, the second concentration of the calibration gas may be calculated, for example, by the controller 114, based upon the detected IR radiation, the known process volume, temperature and pressure, and the characteristics of the particular calibration gas. In some embodiments, the second concentration of the calibration gas includes a second absolute molar abundance of the calibration gas within the process chamber 102.

At 310, the flow rate of the second gas may be calculated by comparing the first concentration and the second concentration of the calibration gas. The calculated flow rate of the second mass flow controller 112 may be compared to the readback value of the second mass flow controller 112. If required, a calibration factor of the second mass flow controller 112 may be adjusted to make the readback value equal the calculated flow rate. In some embodiments, wherein in the calculated flow rate and the readback value are within a less than about 1 percent variance, the mass flow controller 112 may continue to operate without adjustment.

Optionally, at 312, the above mentioned steps may be repeated using additional gases (such as a third gas provided by a third mass flow controller to be calibrated). In some embodiments, the same calibration gas can be used to calibrate additional mass flow controllers providing gas additional gases, provided that the calibration gas and the additional gases do not possess similar IR absorption wavelengths. In some embodiments, the method 300 may be repeated using the second gas as a calibration gas and a third gas provided by a third mass flow controller to be calibrated, provided the mass flow controller 112 has been previously calibrated and the second gas 108 and the third gas do not absorb at similar IR absorption wavelengths.

Further, the method 300 may be repeated at an interval much shorter than the typical drift or shifts in mass flow controllers over time to maintain process chamber performance and matching. For example, the method 300 can be repeated at any desired interval, such as a pre-determined interval, between the exchange of semiconductor wafers, between the exchange of wafer cartridges, at the beginning of each shift or lot being processed, randomly, or the like.

Thus, embodiments of methods and apparatus for calibrating a mass flow controller have been provided herein. The inventive methods and apparatus may advantageously provide improved calibration of mass flow controllers by utilizing IR radiation as a means for accurate and independent calibration. Using such methods, a mass flow controller may be accurately calibrated, in some embodiments, to within about 1% accuracy. The calibration methods can be applied the mass flow controllers of an individual process chamber, or to a plurality of process chambers having a single IR calibration apparatus.

While the foregoing is directed to embodiments of the present invention, other and further embodiments of the invention may be devised without departing from the basic scope thereof, and the scope thereof is determined by the claims that follow.

The invention claimed is:

1. A method of determining the flow rate of a gas provided to a process chamber, comprising:
    measuring a first concentration of a calibration gas provided to the process chamber at a first pressure and temperature by directing infrared radiation into the process chamber and monitoring a first amount of infrared radiation absorbed by the calibration gas;
    providing a mixture of a second gas and the calibration gas to the process chamber while maintaining the first pressure and temperature;
    measuring a second concentration of the calibration gas in the mixture by directing infrared radiation into the process chamber and monitoring a second amount of infrared radiation absorbed by the calibration gas; and
    calculating a flow rate of the second gas by comparing the first and second concentrations of the calibration gas.

2. The method of claim 1, further comprising:
    comparing the flow rate of the second gas to a readback value of a mass flow controller providing the second gas to the process chamber; and
    adjusting a calibration factor of the mass flow controller in response to the comparison.

3. The method of claim 1, further comprising:
    providing a mixture of a third gas and the calibration gas to the process chamber while maintaining the first pressure and temperature;
    measuring a third concentration of the calibration gas in the mixture by directing infrared radiation into the process chamber and monitoring a third amount of infrared radiation absorbed by the calibration gas; and
    calculating a flow rate of the third gas by comparing the first and third concentrations of the calibration gas.

4. The method of claim 3, further comprising:
    comparing the flow rate of the third gas to a readback value of a mass flow controller providing the third process gas to the process chamber; and
    adjusting a calibration factor of the mass flow controller in response to the comparison.

5. The method of claim 1, wherein the second gas either does not absorb infrared radiation or absorbs infrared radiation at a different wavelength than the calibration gas.

6. The method of claim 1, wherein the calibration gas comprises silicon tetrafluoride ($SiF_4$), nitrogen trifluoride ($NF_3$), or carbon tetrafluoride ($CF_4$).

7. The method of claim 1, wherein the infrared radiation is provided by a laser source.

8. A method of calibrating a plurality of mass flow controllers provided to a plurality of process chambers, comprising:
   providing a single infrared radiation source to a plurality of process chambers, each process chamber having a plurality of mass flow controllers coupled thereto; and
   calibrating at least one of the plurality of mass flow controllers of each process chamber by:
   (a) measuring a first concentration of a calibration gas provided to the process chamber at a constant pressure and temperature by directing infrared radiation into the process chamber and monitoring a first amount of infrared radiation absorbed by the calibration gas;
   (b) providing a mixture of a desired gas and the calibration gas to the process chamber while maintaining the constant pressure and temperature;
   (c) measuring a second concentration of the calibration gas in the mixture by directing infrared radiation into the process chamber and monitoring a second amount of infrared radiation absorbed by the calibration gas;
   (d) calculating a flow rate of the desired gas by comparing the first and second concentrations of the calibration gas; and
   (e) comparing the calculated flow rate to a readback value of a mass flow controller providing the desired gas; and
   (f) adjusting a calibration factor of the mass flow controller in response to the comparison;
   wherein (a)-(f) are performed in each process chamber for each mass flow controller to be calibrated.

9. The method of claim 8, wherein the desired gas either does not absorb infrared radiation or absorbs infrared radiation at a different wavelength than the calibration gas.

10. The method of claim 8, wherein the calibration gas is different for each process chamber.

11. The method of claim 8, wherein the calibration is performed serially for each process chamber.

12. The method of claim 8, wherein the calibration is performed in parallel for each process chamber.

13. The method of claim 8, wherein the infrared radiation source is a laser source.

14. The method of claim 13, further comprising:
   routing a signal provided by the infrared radiation source to and from each process chamber at a different pulse frequency for each chamber.

15. The method of claim 8, wherein the calibration gas comprises silicon tetrafluoride ($SiF_4$), nitrogen trifluoride ($NF_3$), or carbon tetrafluoride ($CF_4$).

* * * * *